United States Patent [19]

Mallett

[11] Patent Number: 4,580,252

[45] Date of Patent: Apr. 1, 1986

[54] WIDE BAND ACOUSTIC RECEIVER TRANSDUCER

[75] Inventor: A. J. Mallett, Houston, Tex.

[73] Assignee: Halliburton Company, Duncan, Okla.

[21] Appl. No.: 486,616

[22] Filed: Apr. 20, 1983

[51] Int. Cl.$^4$ .................. H04R 17/00; G01V 1/40
[52] U.S. Cl. .................. 367/180; 181/104; 367/25
[58] Field of Search .......... 367/25, 142, 149, 157, 367/165, 173, 31, 180, 911, 912, 150, 153, 155, 158, 86; 181/102, 104, 122; 73/151, 152

[56] References Cited

U.S. PATENT DOCUMENTS 3,136,381 6/1964 Anderson .................. 367/25
3,409,869 11/1968 McCool et al. ............ 367/157
3,434,563 3/1969 Zemanek, Jr. ............. 181/104

Primary Examiner—Salvatore Cangialosi
Assistant Examiner—K. R. Kaiser
Attorney, Agent, or Firm—W. J. Beard

[57] ABSTRACT

For use in an acoustic logging tool having a sonde adapted to be lowered in a borehole, an improved acoustic transducer comprising a pyramidal frustrum is disclosed. The preferred embodiment incorporates fifteen sides. Each side mounts a piezoelectric crystal for receiving. Mechanical resonant frequencies of the transducer are outside the receiver band width which is about 25 kHz. The resonant frequencies are above 25 kHz, thereby avoiding primary resonant frequencies within the band width.

8 Claims, 2 Drawing Figures

WIDE BAND ACOUSTIC RECEIVER TRANSDUCER

BACKGROUND OF THE DISCLOSURE

Acoustic logging is accomplished with acoustic transmitters and receivers in a sonde. The sonde is lowered in a borehole on a logging cable. Typically two acoustic receiver transducer elements are located in the sonde. Heretofore, acoustic transducer elements have been constructed constrained by with the surrounding structure (the cylindrical sonde), thereby being confined by the shape of the sonde. One typical device which has found favor in the past is a right cylinder transducer. This right cylinder construction has met with great favor in the past. Typically, they are formed of transducer material for operating as a piezoelectric crystal to transmit and receive acoustic signals. One suitable material is lead titanate zirconate. This provides a relatively successful acoustic receiver.

Cylindrical transducer elements exhibit mechanical resonant frequencies. These frequencies are dependent on the geometric construction of the device. For a hollow right cylinder, there are three modes of mechanical resonance, one being dependent on the wall thickness, another being dependent on the length of the right cylinder, and another being dependent on the diameter of the cylinder. Consider as an example a hollow right cylinder made of the above referenced material operating as an acoustic transducer. If the wall thickness is 0.15 inches, the resonant frequency is given by 75/t kHz, or with this thickness, a frequency of about 493 kHz. That is sufficiently high that it poses no problem. Consider such a cylinder which is one inch in length. There is a resonance along the length also. The resonant frequency in this relationship is given by 59/L kHz, or 59 kHz when the length is one inch. This is markedly lower than 493 kHz mentioned above; it is still sufficiently high that it is reasonably out of the range at which it can pose a problem.

If the cylinder has a diameter of 2.5 inches, the radial mode resonance is given by the relationship of 38/d kHz or 14.3 kHz with this diameter. Decreasing the diameter may increase the resonant frequency; that may be desirable but only at a cost. The cost is reduction of power capacity of the smaller transducer. Moreover, if the sonde is able to accommodate a crystal of about 2.5 inches diameter, it is highly desirable that the largest permissible crystal be installed to obtain reasonable coupling to the crystal. Regretably, this is accomplished only at the cost of having a mechanical resonant frequency of 14.3 kHz, a peak which is well within the typical band width of an acoustic receiver.

An acoustic receiver preferably operates with a band width of about 25 kHz frequency, typically between about 1.0 and 25.0 kHz. The radial mode resonance frequency peak is undesirable because it falls in the middle of this band and distorts the gain across the band. The useful data normally is found within a band of about one to about 25 kHz. Because this is true, the resonant frequency of the structure used as the transducer is ideally located outside the band width of the receiving device.

It has been discovered that a cone shaped transducer has resonant frequency points which are higher. Through the use of a hollow cone shaped transducer base structure, resonant frequency points are above 25 kHz and pose no problem. Such a structure does not have resonant frequency points below 25 kHz. For instance, utilizing an aluminum substrate, a cone shaped transducer has been constructed and tested. Such a structure has fifteen sides. The sides are planar surfaces constructed with trapezoidal faces. Suitable transducer crystals are attached by conductive adhesives to the respective trapezoidal faces. It is possible to utilize such a device to form an acoustic transducer having a passband of about one kHz to about 25 kHz wherein the mechanical resonant points are above the desired passband.

BRIEF SUMMARY OF THE DISCLOSURE

This disclosure is directed to a transducer for use in an acoustic well logging apparatus mounted in a sonde. It is constructed to have a passband typically in the range of about one to about 25 kHz, and the device has mechanical resonant points which are substantially above the passband. This displacement of mechanical resonant points enables the antenna to receive in a more linear fashion acoustic data within the passband.

The preferred embodiment comprises a pyramidal frustrum having fifteen sides wherein crystal transducer elements are adhesively mounted thereon. Each crystal is trapezoidal in shape.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
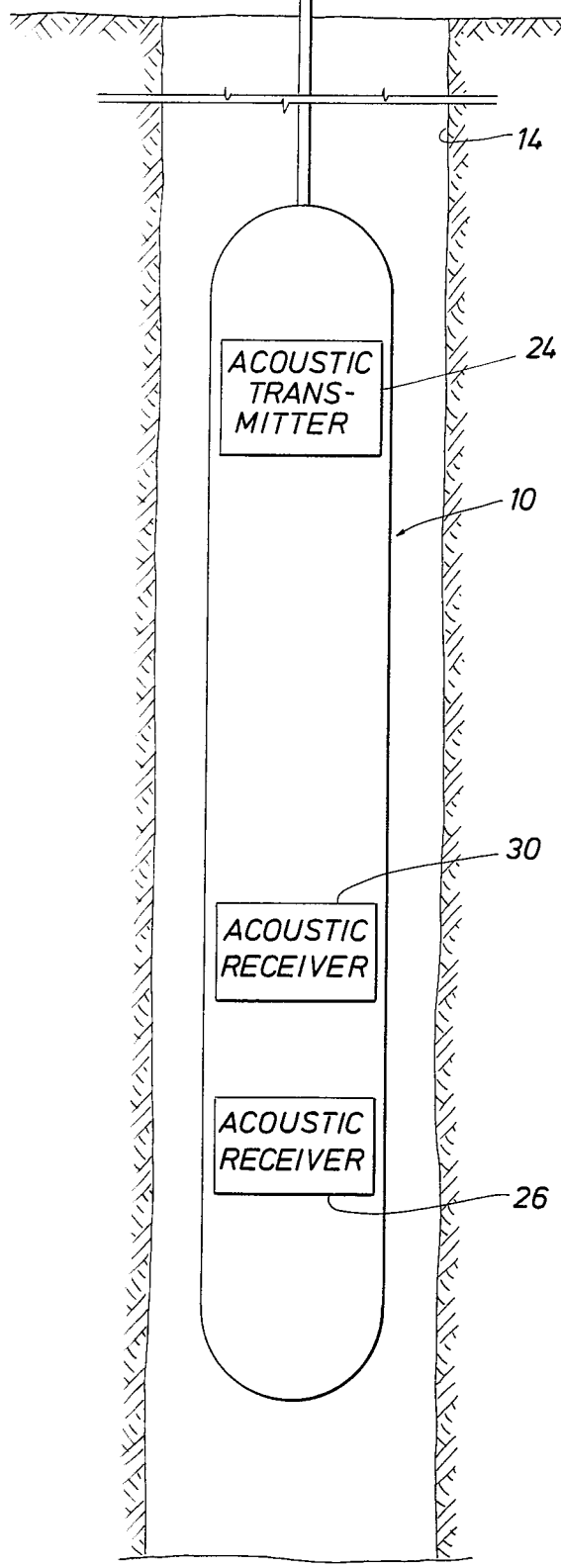
FIG. 1 shows an acoustic logging tool in a borehole, the acoustic tool incorporating an acoustic transducer in accordance with the teachings of this disclosure.

Attention is first directed to FIG. 1 of the drawings which shows an acoustic well logging tool in a sonde 10 which is adapted to be lowered into a well borehole. It is supported on a logging cable 12 so that it may be lowered to any suitable depth to conduct logging operations. The wellbore is identified by the numeral 14. The logging cable extends upwardly to the surface and passes over a sheave 16. This sheave the logging cable into the borehole so that the sonde 10 can lowered to the bottom of the well and then retrieved. Moreover, the sheave 16 is connected with a depth indicating apparatus 18. This forms a signal indicative of the depth of the sonde 10 in the borehole 14. The logging cable 12 carries the output signal from the sonde to the surface to a suitable data processor 20. The data processor 20 is connected to a recorder 22 which records the acoustic data. This data is recorded along with the signal indicative of depth provided by the mechanical or electronic depth indicating apparatus. Accordingly, an acoustic log relative to depth is obtained.

The acoustic logging apparatus in the sonde 10 includes an acoustic transmitter 24 and two acoustic receivers 26 and 30. The transmitter and receivers are devices which are well known in the art.

Figure 2:
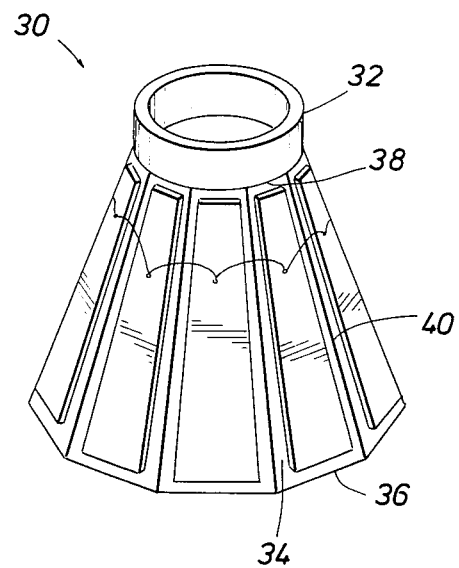
FIG. 2 is a detailed prospective view of the acoustic transducer of the present disclosure.

In FIG. 2 of the drawings, the pyramidal frustrum of the antenna is shown in greater detail. It can be installed with the two receivers 26 and 30. It is typically installed with the smaller end up in the sonde. As shown in FIG. 2, the smaller end comprises a hollow cylindrical end portion 32. It is an upstanding hollow right cylinder joined to a frustrum formed with a number of sides 34. The sides 34 are divergent downwardly and outwardly. Each face 34 is a trapezoidal surface area. The edge 36 is a straight edge parallel to the opposite edge 38 at the other end. That is, there are fifteen faces 34. Adjacent faces are defined at the edges 40.

Preferably, a single piece aluminum construction is used for the basic structure which is shown in FIG. 2. That is, the entire structure is made of one piece and is preferably made of aluminum. It can be sized to need within limits; that is, the size can be increased and decreased. As the diameter of the cylindrical portion 32 is reduced, this changes the mechanical resonant frequency to a higher value and hence away from the desired passband. The relative angle of the straight line edges 40 diverging outwardly is relatively small, less than 20°. Typically, it is in the range of 7° to 14°. The relative length of the straight line segments is typically in the range of 2 to 2.5 inches. This defines a trapezoidal face 34. The face 34 is on the exterior of the pyramidal frustrum of aluminum.

The surface 34 is a surface area suitably located for mounting a transducer crystal thereon. The surface 34 fairly well accommodates a crystal which covers the entire surface except for a marginal border of relatively modest width. The crystal is thus trapezoidal in shape, having parallel planar top and bottom faces, and one typical material for the crystal is lead metaniobate. The crystal is attached to the base by means of a suitable conductive adhesive. This enables the base to serve as a ground terminal for the transducer, and the top face of the crystal is the other terminal of the transducer 30. To this end, and assuming that fifteen faces are utilized, a single conductor is connected to the exposed faces of all fifteen trapezoidal crystals and serves as the second conductor for the transducer to provide an output, the ground conductor being connected to the base thereof.

One such device tested experimentally has yielded mechanical resonant frequencies of 35 kHz or higher. The mechanical resonant frequency of 35 kHz is associated with the maximum diameter of the device; the narrow end of the device is typically associated with a much higher resonant frequency. In the device that was constructed, the narrow end resonant frequency is in the vicinity of 51 kHz. Another resonant frequency is determined by the length of the trapezoidal faces 34, and in one embodiment, this was in the vicinity of about 47 kHz.

Variations and alternations can be made in the device of the present disclosure. The shape or geometry of the pyramidal frustrum can be varied. It is somewhat relative so long as it does not become physically so large that a low resonant frequency is achieved. As a generalization, larger devices have lower resonant frequencies. To this end, the large end of the conic device should not become so large that the resonant frequency drops below about 25 kHz.

Aluminum is the desirable material for the base. Other metals and metal alloys are acceptable in the ordinary circumstance. Aluminum however is preferable because it is easy to machine to shape.

The foregoing is directed to the preferred embodiment, the scope is determined by the claims which follow.

What is claimed is:

1. An acoustic transducer for use in downhole acoustic well logging apparatus in a well logging sonde sized and adapted for passage in a well borehole, the transducer comprising a longitudinally segmented frusto conical base member formed of metal and having the segments thereof defining an integer number N mounting faces each of which is trapezoidally shaped and supporting a trapezoidally shaped piezoelectric crystal element capable of operating as a pressure sensitive receiving transducer in an acoustic well logging apparatus and each such transducer element and the sum of all transducer elements having all mechanical resonant frequencies thereof in excess of a passband frequency required of such a transducer, said transducer elements being connected in parallel to form a single wideband piezoelectric acoustic receiving transducer.

2. The apparatus of claim 1 wherein N is 15.

3. The apparatus of claim 2 wherein said base member is aluminum.

4. the apparatus of claim 3 wherein said transducer has mechanical resonant frequencies above about 25 kHz.

5. The apparatus of claim 4 wherein the frusto conical base member has an angle of divergence of less than 20°.

6. The apparatus of claim 5 wherein the frusto conical base member has an angle of divergence of 7° to 14°.

7. The apparatus of claim 6 wherein the frusto conical base member has a surrounding right hollow cylinder at the small end thereof.

8. The apparatus of claim 1 wherein:
   (a) said base member is formed of aluminum;
   (b) said base member having straight line segment edges between adjacent faces;
   (c) said straight line segments being between about 2 to 2.5 inches in length;
   (d) said faces supporting said crystals thereon;
   (e) said crystals being connected in parallel by an electrical conductor; and
   (f) said base member having an electrical ground connection with said crystals.

* * * * *